(12) United States Patent
Huang

(10) Patent No.: US 12,498,699 B2
(45) Date of Patent: Dec. 16, 2025

(54) MACHINE LEARNING DEVICE, ADDITIVE MANUFACTURING SYSTEM, MACHINE LEARNING METHOD FOR WELDING CONDITION, METHOD FOR DETERMINING WELDING CONDITION, AND A NON-TRANSITORY COMPUTER READABLE MEDIUM

(71) Applicant: KOBE STEEL, LTD., Hyogo (JP)

(72) Inventor: Shuo Huang, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 481 days.

(21) Appl. No.: 18/006,366

(22) PCT Filed: Jun. 16, 2021

(86) PCT No.: PCT/JP2021/022942
§ 371 (c)(1),
(2) Date: Jan. 20, 2023

(87) PCT Pub. No.: WO2022/019013
PCT Pub. Date: Jan. 27, 2022

(65) Prior Publication Data
US 2023/0259099 A1    Aug. 17, 2023

(30) Foreign Application Priority Data
Jul. 20, 2020    (JP) .................... 2020-123775

(51) Int. Cl.
*G05B 19/4099*    (2006.01)
*B33Y 30/00*    (2015.01)
*B33Y 50/00*    (2015.01)

(52) U.S. Cl.
CPC .......... *G05B 19/4099* (2013.01); *B33Y 30/00* (2014.12); *B33Y 50/00* (2014.12); *G05B 2219/32335* (2013.01)

(58) Field of Classification Search
CPC ...... G05B 19/4099; G05B 2219/32335; B33Y 30/00; B33Y 50/00; B33Y 50/02;
(Continued)

(56) References Cited

U.S. PATENT DOCUMENTS

2017/0028499 A1    2/2017    Yoshida et al.
2019/0351509 A1*   11/2019   Kayashima ............ B23K 15/00
(Continued)

FOREIGN PATENT DOCUMENTS

CN    110883403 A   *  3/2020   ........... B23K 31/125
JP    2017-030014 A    2/2017
JP    2020-006378 A    1/2020

OTHER PUBLICATIONS

The extended European search report issued by the European Patent Office on Nov. 7, 2023, which corresponds to European Patent Application No. 21845759.6-1103 and is related to U.S. Appl. No. 18/006,366.

*Primary Examiner* — Yuhui R Pan
(74) *Attorney, Agent, or Firm* — Studebaker Brackett PLLC

(57) ABSTRACT

A machine learning device that performs machine learning of a welding condition for manufacturing an additively-manufactured object by welding a filler metal and depositing weld beads, the machine learning device includes: at least one hardware processor configured to perform a learning process for generating a learned model using a welding condition of a weld bead and a block pattern formed by the weld bead as input data and shape data of the weld bead as output data.

5 Claims, 8 Drawing Sheets

(58) Field of Classification Search
CPC .......... B33Y 10/00; B22F 10/25; B22F 10/38;
B22F 10/80; B22F 10/85; B22F 12/90;
B23K 9/042; B23K 9/0953; B23K
31/006; G06N 3/09; G06N 3/0464; G06N
3/084; Y02P 10/25
See application file for complete search history.

(56) References Cited

U.S. PATENT DOCUMENTS

| | | |
|---|---|---|
| 2020/0023586 A1 | 1/2020 | Shin et al. |
| 2020/0368970 A1* | 11/2020 | Georgeson ............. B33Y 10/00 |
| 2022/0161344 A1* | 5/2022 | Zhang .................. B23K 31/125 |

* cited by examiner

MACHINE LEARNING DEVICE, ADDITIVE MANUFACTURING SYSTEM, MACHINE LEARNING METHOD FOR WELDING CONDITION, METHOD FOR DETERMINING WELDING CONDITION, AND A NON-TRANSITORY COMPUTER READABLE MEDIUM

TECHNICAL FIELD

The present invention relates to a machine learning device, an additive manufacturing system, a machine learning method for a welding condition, a method for determining a welding condition, and a program. More specifically, the present invention relates to a technique for determining a manufacturing condition when an additively-manufactured object is manufactured by depositing weld beads.

BACKGROUND ART

In the related art, an additively-manufactured object is manufactured by depositing weld beads. When additive manufacturing is performed, it is necessary to perform control in consideration of various welding conditions in order to improve the manufacturing accuracy. Since there are many combinations of such welding conditions, the extraction of suitable welding conditions is very complicated and troublesome when performed manually.

In relation to the above situation, for example, Patent Literature 1 discloses a learning device for automatically determining an optimum welding condition in a welding device without teaching by a skilled operator. In this case, as information used for learning, bead appearance, a height and a width of a bead, a penetration amount, and the like are shown.

CITATION LIST

Patent Literature

Patent Literature 1: JP2017-30014A

SUMMARY OF INVENTION

Technical Problem

As described above, in the adjustment of the welding condition at the time of additive manufacturing, a very large number of condition combinations are conceivable to understand a change tendency of a bead shape (width, height, and the like), and it is difficult to specify an appropriate combination. In addition, when a bead is formed, a shape of the bead to be formed may vary even under the same welding condition depending on a relation between the bead and an already formed peripheral bead. For example, it is conceivable to create a database in which combinations of welding conditions and bead arrangement patterns are defined, but there are a large number of the bead arrangement patterns, and it is complicated and troublesome to create a database in association with the welding conditions. In Patent Literature 1 described above, such a change tendency of the bead shape according to the arrangement pattern is not considered, and there is room for improvement in this respect as well.

In view of the above problems, an object of the present invention is to determine a more appropriate welding condition at the time of manufacturing an additively-manufactured object.

SOLUTION TO PROBLEM

In order to solve the above problems, the present invention has the following configurations.

(1) A machine learning device that performs machine learning of a welding condition for manufacturing an additively-manufactured object by welding a filler metal and depositing weld beads, the machine learning device including:

at least one hardware processor configured to perform a learning process for generating a learned model using a welding condition of a weld bead and a block pattern formed by the weld bead as input data and shape data of the weld bead as output data.

Further, the present invention according to another aspect has the following configurations.

(2) An additive manufacturing system for manufacturing an additively-manufactured object by welding a filler metal and depositing weld beads, the additive manufacturing system including:

at least one hardware processor configured to create, based on design data of the additively-manufactured object, a plurality of pieces of pass data corresponding to a plurality of weld beads forming the additively-manufactured object;

determine welding conditions for forming weld beads corresponding to the respective pieces of created pass data;

specify a block pattern formed by a weld bead based on an arrangement when the weld bead is formed;

derive shape data corresponding to pass data by inputting a determined welding condition corresponding to the pass data and the specified block pattern to a learned model generated by performing a learning process using a welding condition of a weld bead and a block pattern formed by the weld bead as input data and shape data of the weld bead as output data; and adjust the welding condition such that a difference between the derived shape data and shape data indicated by the created pass data does not exceed a predetermined threshold.

Further, the present invention according to another aspect has the following configurations.

(3) A machine learning method of a welding condition for manufacturing an additively-manufactured object by welding a filler metal and depositing weld beads, the machine learning method including:

a learning process step of performing a learning process for generating a learned model using a welding condition of a weld bead and a block pattern formed by the weld bead as input data and shape data of the weld bead as output data.

Further, the present invention according to another aspect has the following configurations.

(4) A method for determining a welding condition in an additive manufacturing system that manufactures an additively-manufactured object by welding a filler metal and depositing weld beads, the method including:

a creation step of creating, based on design data of the additively-manufactured object, a plurality of pieces of pass data corresponding to a plurality of weld beads forming the additively-manufactured object;

a determination step of determining welding conditions for forming weld beads corresponding to the respective pieces of pass data created in the creation step;

a specifying step of specifying a block pattern formed by a weld bead based on an arrangement when the weld bead is formed;

a deriving step of deriving shape data corresponding to pass data determined in the determination step by inputting welding conditions corresponding to the pass data and the block pattern specified in the specifying step to a learned model generated by performing a learning process using a welding condition of a weld bead and a block pattern formed by the weld bead as input data and using shape data of the weld bead as output data; and an adjusting step of adjusting the welding conditions such that a difference between the shape data derived by the deriving unit and shape data indicated by the pass data created in the creation step does not exceed a predetermined threshold.

Further, the present invention according to another aspect has the following configurations.

(5) A non-transitory computer readable medium storing a program configured to cause a computer to execute:

a learning process step of performing a learning process for generating a learned model using a welding condition of a weld bead forming an additively-manufactured object and a block pattern formed by the weld bead as input data and shape data of the weld bead as output data.

Further, the present invention according to another aspect has the following configurations.

(6) A non-transitory computer readable medium storing a program configured to cause a computer to execute:

a creation step of creating a plurality of pieces of pass data corresponding to a plurality of weld beads forming an additively-manufactured object, based on design data of the additively-manufactured object manufactured by welding a filler metal and depositing weld beads, a determination step of determining welding conditions for forming weld beads corresponding to the respective pieces of pass data created in the creation step, a specifying step of specifying a block pattern formed by a weld bead based on an arrangement when the weld bead is formed, a deriving step of deriving shape data corresponding to pass data determined in the determination step by inputting welding conditions corresponding to the pass data and the block pattern specified in the specifying step to a learned model generated by performing a learning process using a welding condition of a weld bead and a block pattern formed by the weld bead as input data and using shape data of the weld bead as output data, and an adjusting step of adjusting the welding conditions such that a difference between the shape data derived by the deriving unit and shape data indicated by the pass data created in the creation step does not exceed a predetermined threshold.

Advantageous Effects of Invention

According to the present invention, it is possible to determine a more appropriate welding condition at the time of manufacturing an additively-manufactured object.

DESCRIPTION OF EMBODIMENTS

Figure 1:
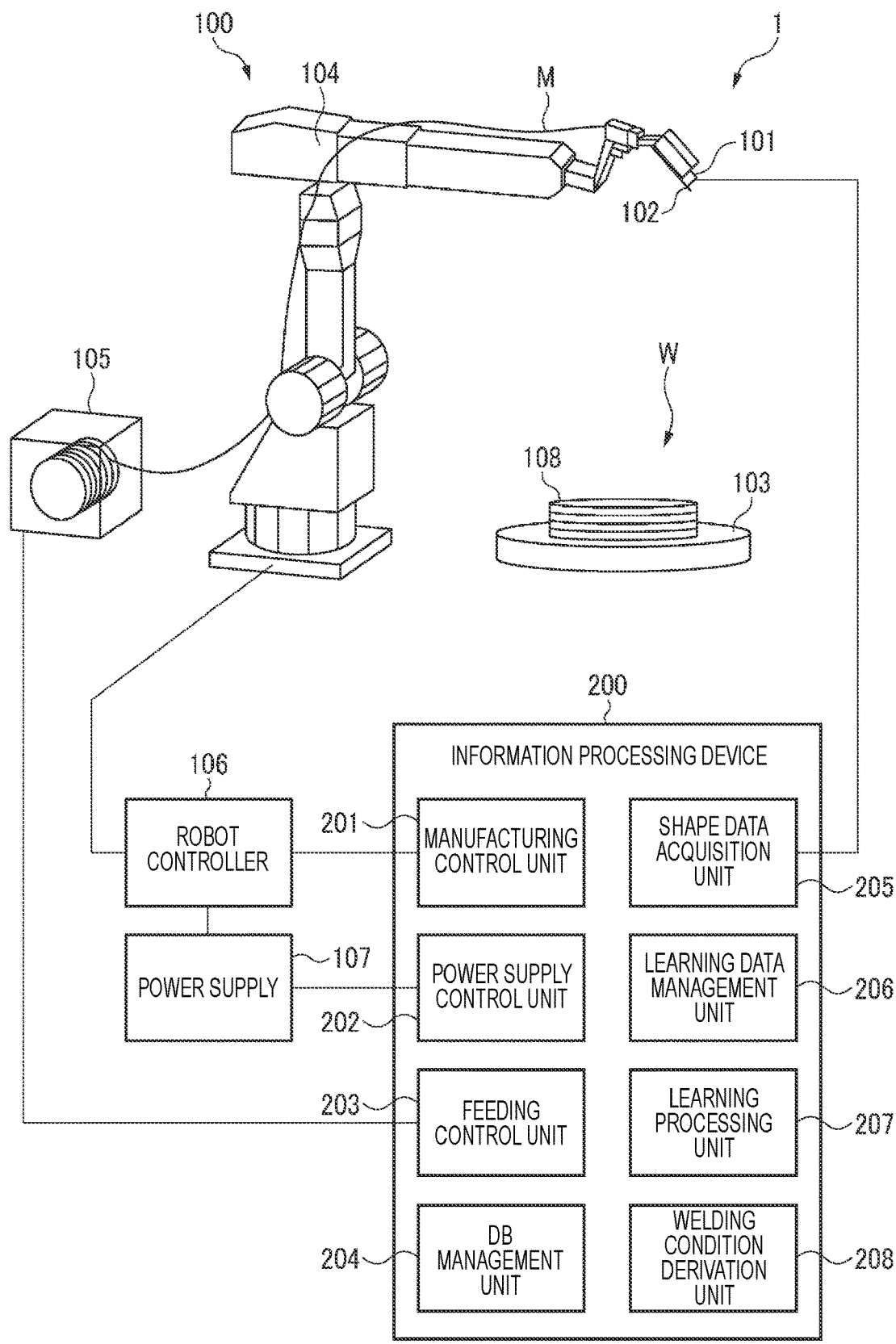
FIG. 1 is a schematic configuration diagram showing a configuration example of an additive manufacturing system according to an embodiment of the present invention.

Hereinafter, embodiments for carrying out the present invention will be described with reference to the drawings. The embodiments described below are embodiments for explaining the present invention and are not intended to be construed as limiting the present invention, and not all configurations described in the respective embodiments are essential configurations for solving the problems of the present invention. In the drawings, the same components are denoted by the same reference numerals to indicate the correspondence.

First Embodiment

Hereinafter, a first embodiment of the present invention will be described.

[System Configuration]

Hereinafter, an embodiment of the present invention will be described in detail with reference to the drawings. FIG. 1 is a schematic configuration diagram of an additive manufacturing system to which the present invention can be applied.

An additive manufacturing system 1 according to the present embodiment includes an additive manufacturing device 100 and an information processing device 200 that integrally controls the additive manufacturing device 100.

The additive manufacturing device 100 includes a welding robot 104, a filler metal feeding unit 105 for feeding a filler metal (welding wire) M to a torch 102, a robot controller 106 that controls the welding robot 104, and a power supply 107.

The welding robot 104 is an articulated robot, and the filler metal M is supported by the torch 102 provided on a distal shaft so as to be continuously fed. The torch 102 holds the filler metal M in a state in which the filler metal M protrudes from its tip. A position and a posture of the torch 102 can be freely set three-dimensionally within a range of degrees of freedom of a robot arm constituting the welding robot 104.

The torch 102 includes a shield nozzle (not shown), and a shield gas is supplied from the shield nozzle. The shield gas blocks the atmosphere and prevents oxidation, nitridation, and the like of a molten metal during welding to prevent lack of fusion. An arc welding method used in the present embodiment may be either a consumable electrode type such as shielded metal arc welding or carbon dioxide gas shielded arc welding, or a non-consumable electrode type such as TIG welding or plasma arc welding, and is appropriately selected according to an additively-manufactured object W to be manufactured.

In a vicinity of the torch 102, a shape sensor 101 capable of moving following the movement of the torch 102 is provided. The shape sensor 101 detects a shape of the additively-manufactured object W formed on a base 103. In the present embodiment, the shape sensor 101 can detect a height, a position, a width, and the like of a weld bead 108 (also simply referred to as a "bead") forming the additively-manufactured object W. Information detected by the shape sensor 101 is transmitted to the information processing device 200. A configuration of the shape sensor 101 is not particularly limited, and the shape sensor 101 may be configured to detect the shape by contact (contact sensor), or may be configured to detect the shape by a laser or the like (non-contact sensor).

In the welding robot 104, when the arc welding method is a consumable electrode type, a contact tip is disposed inside the shield nozzle, and the filler metal M to which a molten current is supplied is held by the contact tip. The torch 102 generates an arc from the tip of the filler metal M in a shield gas atmosphere while holding the filler metal M. The filler metal M is fed from the filler metal feeding unit 105 to the torch 102 by a feeding mechanism (not shown) attached to the robot arm or the like. When the continuously fed filler metal M is melted and solidified while moving the torch 102, the linear weld bead 108, which is a melted and solidified body of the filler metal M, is formed on the base 103. By depositing the weld beads 108, the additively-manufactured object W is manufactured.

A heat source for melting the filler metal M is not limited to the arc described above. For example, a heat source using another method such as a heating method using an arc and a laser in combination, a heating method using plasma, or a heating method using an electron beam or a laser may be used. In the case of heating with an electron beam or a laser, a heating amount can be more finely controlled to keep the weld bead 108 in a more proper state, thereby contributing to further improvement of the quality of the additively-manufactured object W.

The robot controller 106 drives the welding robot 104 by a predetermined drive program based on an instruction from the information processing device 200, and manufactures the additively-manufactured object W on the base 103. That is, the welding robot 104 moves the torch 102 while melting the filler metal M with an arc according to a command from the robot controller 106. The power supply 107 is a welding power supply that supplies power required for welding to the robot controller 106. The power supply 107 can operate in a plurality of control modes, and can switch the power (current, voltage, or the like) when supplying power to the robot controller 106 according to the control mode. The filler metal feeding unit 105 controls the feeding and a feeding speed of the filler metal M to the torch 102 of the welding robot 104 based on an instruction from the information processing device 200.

The information processing device 200 may be, for example, an information processing device such as a personal computer (PC). Functions shown in FIG. 1 may be implemented by a control unit (not shown) reading and executing a program of a function according to the present embodiment stored in a storage unit (not shown). The storage unit may include a random access memory (RAM) that is a volatile storage area, a read only memory (ROM), a hard disk drive (HDD), and the like that are non-volatile storage areas. As the control unit, a central processing unit (CPU), a graphical processing unit (GPU), a general-purpose computing on graphics processing units (GPGPU), or the like may be used.

The information processing device 200 includes a manufacturing control unit 201, a power supply control unit 202, a feeding control unit 203, a DB management unit 204, a shape data acquisition unit 205, a learning data management unit 206, a learning processing unit 207, and a welding condition derivation unit 208. The manufacturing control unit 201 generates, based on design data (for example, CAD/CAM data) of the additively-manufactured object W to be manufactured, a control signal for the robot controller 106 at the time of manufacturing.

Here, the control signal includes a movement trajectory of the torch 102 by the welding robot 104, a welding condition at the time of forming the weld bead 108, the feeding speed of the filler metal M by the filler metal feeding unit 105, and the like. The movement trajectory of the torch 102 is not limited to a trajectory of the torch 102 during the formation of the weld bead 108 on the base 103, and includes, for example, a trajectory of the torch 102 to a start position at which the weld bead 108 is formed.

The power supply control unit 202 controls the power supply (control mode) to the robot controller 106 by the power supply 107. Values of a current and a voltage, a waveform (pulse) of the current, and the like when forming beads having the same shape may also differ depending on the control mode. In addition, the power supply control unit 202 acquires, from the power supply 107, information on a current or a voltage provided to the robot controller 106 at an appropriate time.

The feeding control unit 203 controls the feeding speed and feeding timing of the filler metal M by the filler metal feeding unit 105. Here, the feeding control of the filler metal M includes not only the feeding (forward feeding) but also the returning (backward feeding). The DB management unit 204 manages a DB (database) according to the present embodiment. Details of the DB according to the present embodiment will be described later. The shape data acquisition unit 205 acquires shape data of the weld bead 108 formed on the base 103 detected by the shape sensor 101.

The learning data management unit 206 generates and manages learning data used in a learning process performed by the learning processing unit 207. The learning processing unit 207 performs the learning process using the learning data managed by the learning data management unit 206. Details of the learning data and the learning process according to the present embodiment will be described later. In addition, the learning processing unit 207 manages a learned model obtained as a result of the learning process.

The welding condition derivation unit 208 derives a welding condition used by the manufacturing control unit 201 using a learned model generated by the learning processing unit 207, and notifies the manufacturing control unit 201 of the welding condition. The process performed by the welding condition derivation unit 208 will be described later.

In the present embodiment, as shown in FIG. 1, a configuration in which the weld bead 108 is formed by moving the torch 102 on the cylindrical base 103 to manufacture the additively-manufactured object W will be described as an example. In FIG. 1, the base 103 of the present embodiment has a configuration in which the additively-manufactured object W is manufactured on a plane of a cylinder, and the base 103 is not limited thereto. For example, the base 103 may have a cylindrical shape, and the weld bead 108 may be formed on an outer periphery of a side surface of the base 103. In addition, a coordinate system in the design data according to the present embodiment is associated with a coordinate system on the base 103 on which the additively-manufactured object W is manufactured, and three axes (X axis, Y axis, and Z axis) of the coordinate system are set such that a three-dimensional position is defined with any position as an origin.

The additive manufacturing system 1 configured as described above melts the filler metal M and feeds the melted filler metal M onto the base 103 while moving the torch 102 according to the movement trajectory of the torch 102 defined based on the set manufacturing data by driving the welding robot 104. As a result, the additively-manufactured object W in which a plurality of linear weld beads 108 are arranged and deposited on an upper surface of the base 103 is manufactured.

<Control Parameters During Manufacturing>

When manufacturing the additively-manufactured object W, it is necessary to determine and adjust various control parameters depending on an operation state of the power supply 107, characteristics specific to devices, the configuration of the additively-manufactured object W, and the like. Examples of items as the control parameters that are taken into consideration when performing additive manufacturing and data items indicating a shape of a bead to be formed will be described below.

(Control Parameters)

Welding conditions (wire feeding speed, travel speed, torch moving speed, etc.)

Control profile for type of welding power supply and current and voltage

Start part/end part processing conditions (application conditions of current and voltage in formation of start and end parts of bead)

Wires used (wire type, wire diameter, etc.) and wire components (physical properties such as viscosity, surface tension, etc.)

Inter-pass temperature and inter-pass time

Temperature of beads adjacent to each other in up, down, left, right, or oblique directions (hereinafter, referred to as "adjacent beads")

Angle of torch

Welding amount of filler metal

Target position (distance from adjacent bead, etc.)

Weaving conditions (frequency and amplitude in weaving)

(Shape Data)

Height, width, angle of a root part and volume of bead

Lower layer shape

Surface shape of laminated member and size of surface unevenness

Overall shape of laminated component (overall height, width, volume, etc.)

Shape of start part/end part of bead

Presence/absence and size of internal defect

Region shapes (depth and width) of penetrated zone and heat-affected zone (HAZ)

The items described above are examples, and some of these items may be used, or other items may be used.

Figure 2:
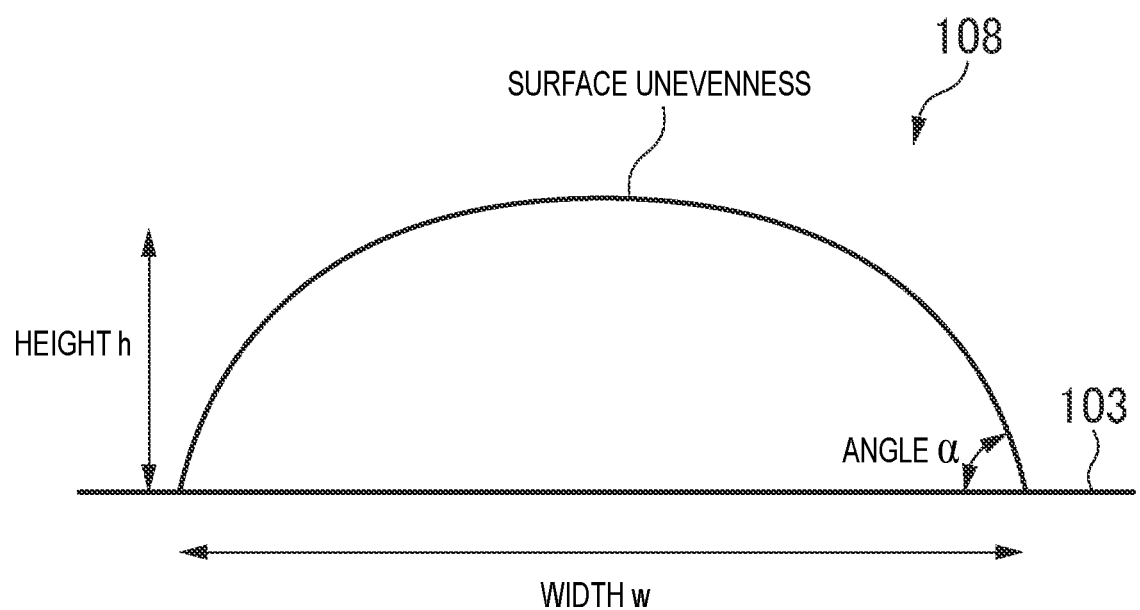
FIG. 2 is a conceptual diagram for illustrating bead shape data.

FIG. 2 is a conceptual diagram for illustrating shape data of a weld bead. FIG. 2 shows a cross section of the weld bead 108 formed on the base 103 as seen from a travel direction of the torch 102 during formation. As shown in FIG. 2, as the shape data of the weld bead 108, information such as a height h, a width w, an angle α of a root part, and surface unevenness can be used.

<Database>

In the present embodiment, a database indicating a relation between a welding condition and shape information of a weld bead formed under the welding condition is used. The database is managed by the DB management unit 204 and is defined in advance.

In the database, a predetermined control parameter as a welding condition and information on a shape of a bead formed when welding is performed using the control parameter are stored in association with each other. Items of the welding condition include the control parameters as described above. Items of the information on a bead shape also includes the items of the shape data as described above. In the database according to the present embodiment, the welding condition may be associated with the shape data when the weld bead 108 is formed on the base 103. Alternatively, the welding condition may be associated with the shape data when the weld bead 108 is formed in layers on the weld bead 108 formed in a predetermined shape. Alternatively, both pieces of information may be included.

<Block Pattern>

As described above, in the present embodiment, the additively-manufactured object W is manufactured by depositing a plurality of beads. At this time, when one of the beads is of interest, a plurality of patterns can be defined according to a positional relation with a bead located around the bead, a position on the base 103, and the like. This pattern is referred to as a block pattern in the present embodiment.

Figure 3:
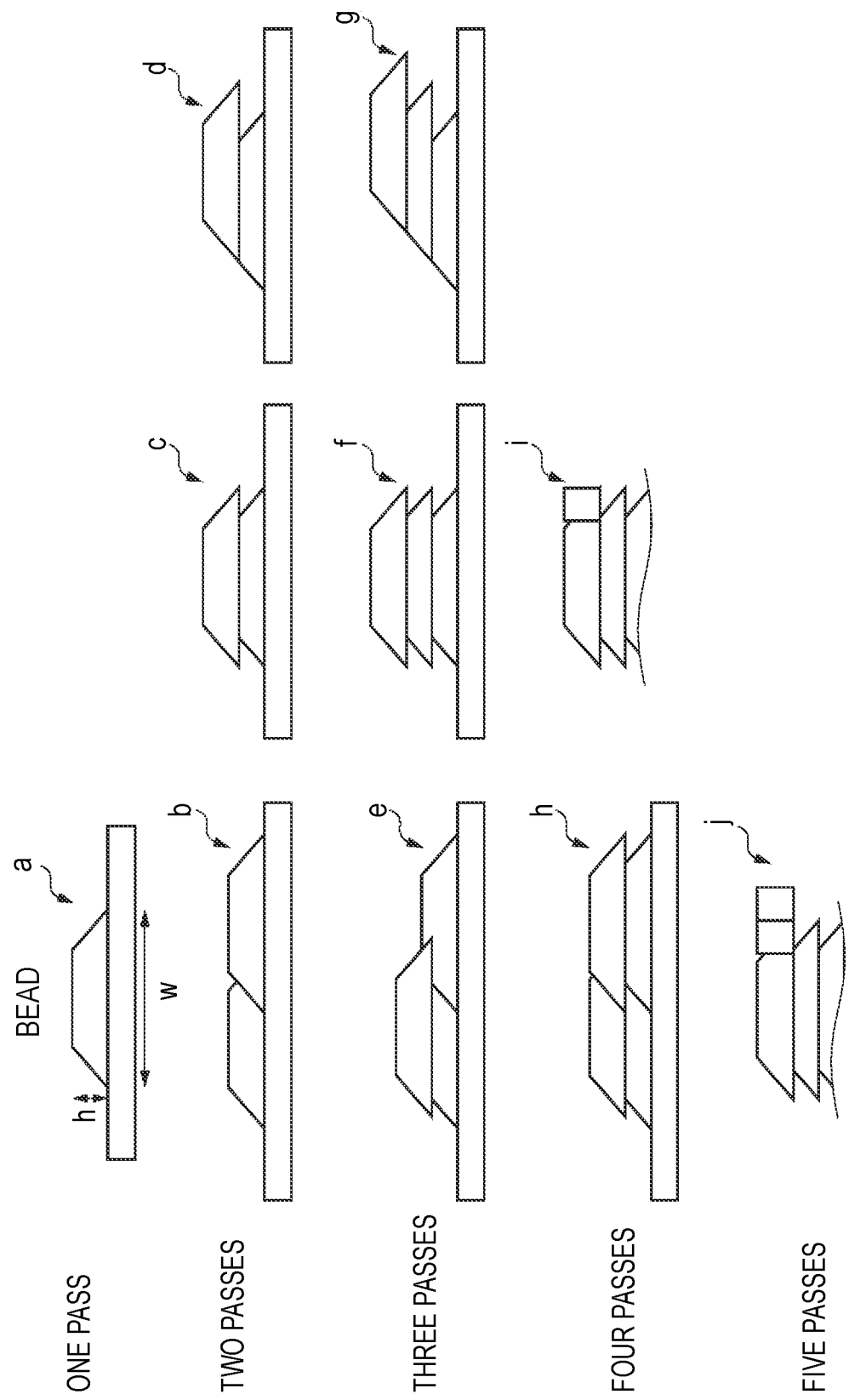
FIG. 3 is a conceptual diagram showing an example of a block pattern according to an embodiment of the present invention.

FIG. 3 is a diagram showing an example of a basic classification of the block pattern according to the present embodiment, and is a schematic diagram showing a cross-sectional shape viewed from a formation direction side of a bead. Here, in order to simplify the description, the cross section of the bead is simplified by a trapezoid or the like. The block pattern is defined according to the number of forming beads (the number of passes), and in the present embodiment, ten types of block patterns formed by one pass to five passes will be described as an example.

A block pattern (block pattern a) formed by one pass has one type, and the block pattern has no adjacent bead. Block patterns (block patterns b to d) formed by two passes have three types. More specifically, the block pattern b has a configuration in which two beads are arranged in a width direction of the beads (one layer and two rows). The block pattern c has a configuration in which two beads overlap each other in a height direction and center positions of the beads in the width direction coincide with each other (two layers and one row). The block pattern c has a configuration in which two beads overlap each other in the height direction and center positions of the beads in the width direction are different from each other (two layers and one row).

Block patterns (block patterns e to g) formed by three passes have three types. More specifically, the block pattern e has a configuration in which two beads are arranged in the width direction of the beads, and on one side of the two beads arranged in the width direction, two beads overlap each other in the height direction (two layers and one row+one layer and one row). The block pattern f has a configuration in which three beads overlap each other in the height direction and center positions of the beads in the width direction coincide with each other (three layers and one row). The block pattern g has a configuration in which three beads overlap each other in the height direction and center positions of the beads in the width direction are different from each other (three layers and one row).

Block patterns (block patterns h to i) formed by four passes have two types. More specifically, the block pattern h has a configuration in which two beads are arranged in the width direction of the beads, and on both sides of the two beads arranged in the width direction, two beads overlap each other in the height direction (two layers and two rows). The block pattern i has a configuration in which three beads overlap each other in the height direction and one bead is adjacent to the bead located in an uppermost layer in the width direction (3 layers and 1 row+one row of an adjacent bead to the uppermost layer). A block pattern (block pattern j) formed by five passes has one type. More specifically, three beads overlap each other in the height direction, and two beads are arranged side by side in the width direction and adjacent to a bead located in an uppermost layer (three layers and one row+two rows of beads adjacent to the uppermost layer). Among the deposited beads, a bead of a lowermost layer is not limited to a state of being formed on the base 103.

In the present embodiment, the weld bead is associated with at least one of the block patterns described above. The classification of the block patterns shown in FIG. 3 is an example, and the classification is not limited thereto. For example, a block pattern other than those described above may be used depending on a shape and a size of the additively-manufactured object W to be manufactured, a material of the filler metal M, and the like.

<Learning Process>

In the present embodiment, a method of deep learning using a neural network among machine learning methods is used as a learning method, and supervised learning will be described as an example. A more specific method (algorithm) of deep learning is not particularly limited, and for example, a known method such as a convolutional neural network (CNN) may be used. In addition, a type and the number of layers constituting the neural network are also not particularly limited.

Figure 4:
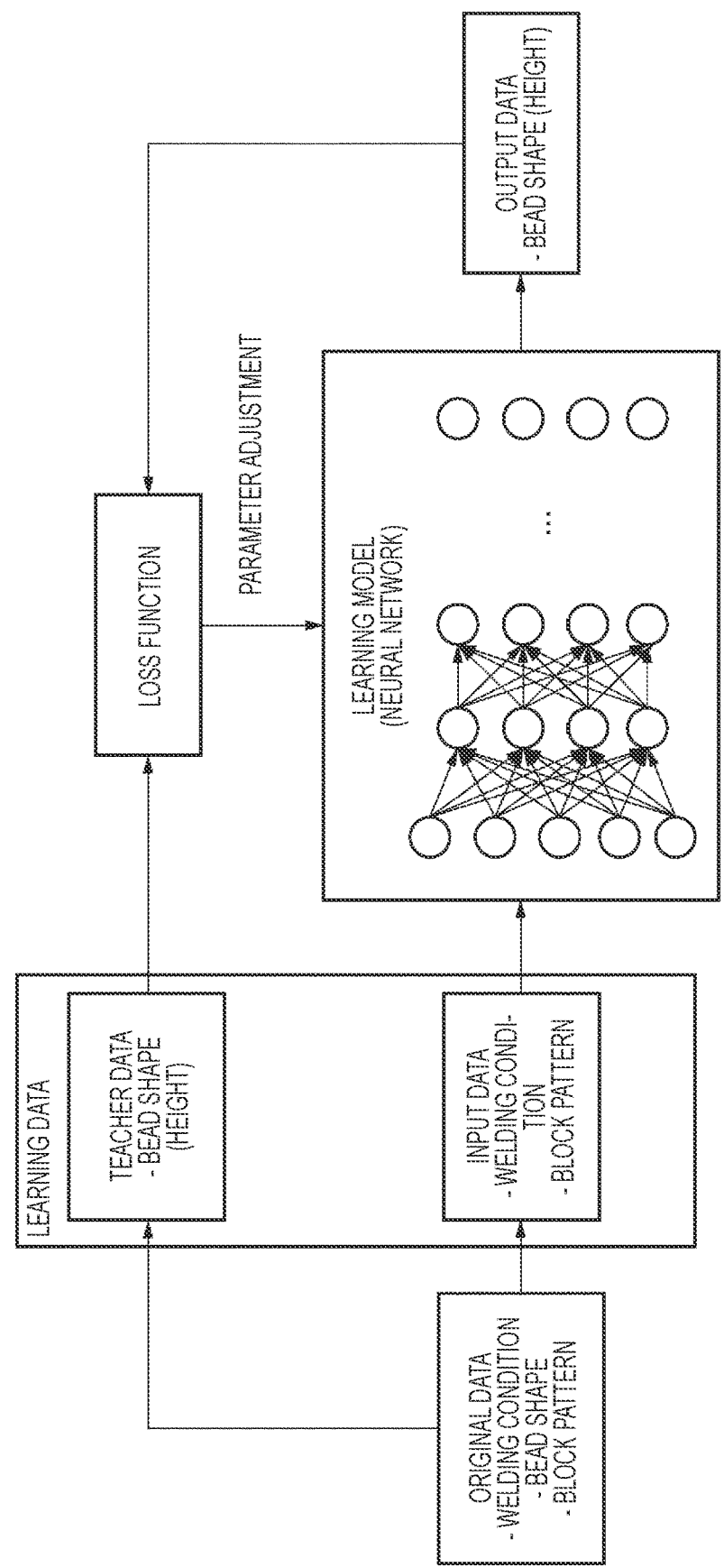
FIG. 4 is a schematic diagram for illustrating a concept of learning according to an embodiment of the present invention.

FIG. 4 is a schematic diagram for illustrating a concept of the learning process according to the present embodiment. First, learning data used in the learning process is prepared. The learning data is prepared by converting original data into a format suitable for learning. As the original data, a welding condition, a shape of a bead formed based on the welding condition, and a block pattern of the bead are prepared. Here, as the bead shape, a bead height, which is one of the elements thereof, will be described as an example. In the present embodiment, as the learning data used in the learning process, the welding condition and the block pattern in the original data are used as input data, and the bead shape is used as teacher data. A plurality pieces of such learning data are prepared. The block pattern has the configurations described with reference to FIG. 3.

In the present embodiment, the learning process is performed using the learning data described above. When input data (here, the welding condition and the block pattern) prepared as the learning data is input to a learning model, bead shape data is output as output data for the input data. The output data corresponds to the bead shape (height). Next, an error is derived by a loss function using the output data and the teacher data (here, bead shape (height)) prepared as the learning data. Then, parameters in the learning model are adjusted so as to reduce the error. For the adjustment of the parameters, for example, an error back propagation method or the like may be used. In this way, the learned model is generated by repeatedly performing learning using a plurality of pieces of learning data. Since the learned model is updated each time the learning process is performed, parameters constituting the learned model are changed according to the timing of use, and an output result with respect to the input data is also different.

The information processing device 200 does not necessarily need to perform the learning process. For example, the information processing device 200 may be configured to provide the learning data to a learning server (not shown) provided outside the information processing device 200 and perform the learning process on the server side. If necessary, the server may provide the learned model to the information processing device 200. Such a learning server may be located on a network (not shown) such as the Internet, for example, and the server and the information processing device 200 are communicably connected to each other. That is, the information processing device 200 may operate as a machine learning device, or an external device may operate as a machine learning device. In any case, the information processing device 200 acquires the learned model obtained by the learning process and can be used when the additively-manufactured object W is manufactured.

Figure 5:
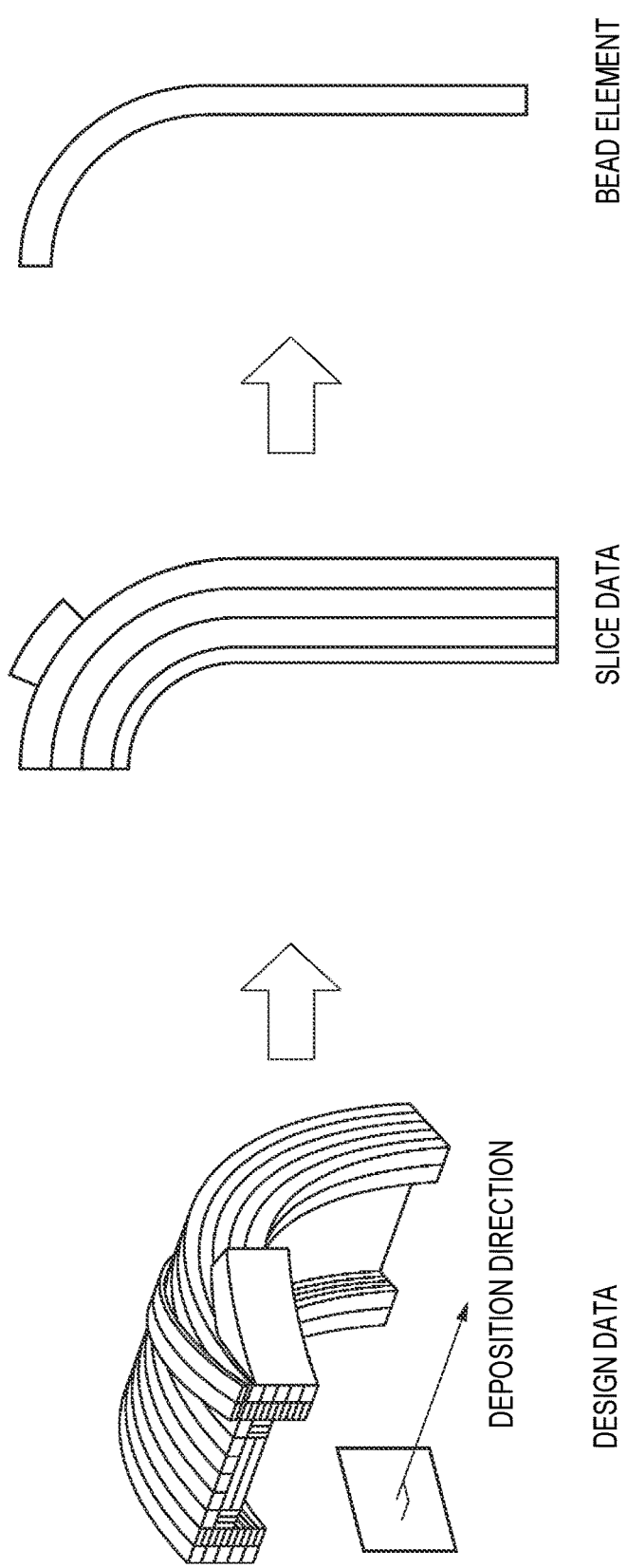
FIG. 5 is a schematic diagram for illustrating a concept of obtaining a bead element based on design data of an additively-manufactured object according to an embodiment of the present invention.

FIG. 5 is diagram for illustrating a concept of extracting a bead element from the design data in the process according to the present embodiment. The design data is data indicating a design shape of the additively-manufactured object W. The additively-manufactured object W is manufactured by depositing weld beads in a predetermined deposition direction based on the design data. In the example of FIG. 5, a case in which the beads are deposited in a direction indicated by an arrow will be described. The deposition direction can be set to any direction according to the shape of the additively-manufactured object W.

First, the deposition direction is defined based on the design data, and one or more layers are divided (sliced) in a direction perpendicular to the deposition direction. As a result, one or more pieces of slice data are determined. Here, the number of pieces of the slice data (the number of layers) changes according to a size, a shape, a thickness of the layer, and the like of the additively-manufactured object W indicated by the design data. Each piece of the slice data is further divided into bead elements corresponding to one pass at the time of bead formation.

Figure 6:
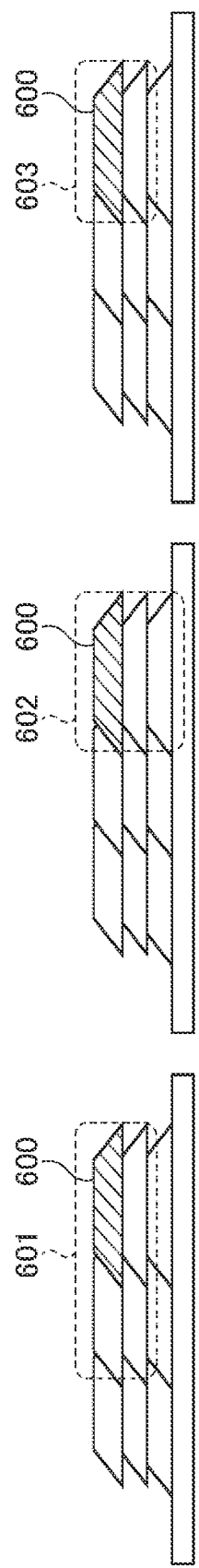
FIG. 6 is a schematic diagram for illustrating block pattern association according to an embodiment of the present invention.

FIG. 6 is a diagram for illustrating a block pattern associated with a bead 600 of interest. Here, a block pattern associated with the bead 600 when the bead 600 is formed will be described as an example. Beads are formed in order from a lower layer, and other beads are already formed around the bead 600. In this case, the bead 600 can be associated with a four-pass block pattern h (broken line 601), a three-pass block pattern (broken line 602), and a two-pass block pattern c (broken line 603) among the block patterns shown in FIG. 3.

<Process Flow>

(Welding Condition Determination Process)

Figure 7:
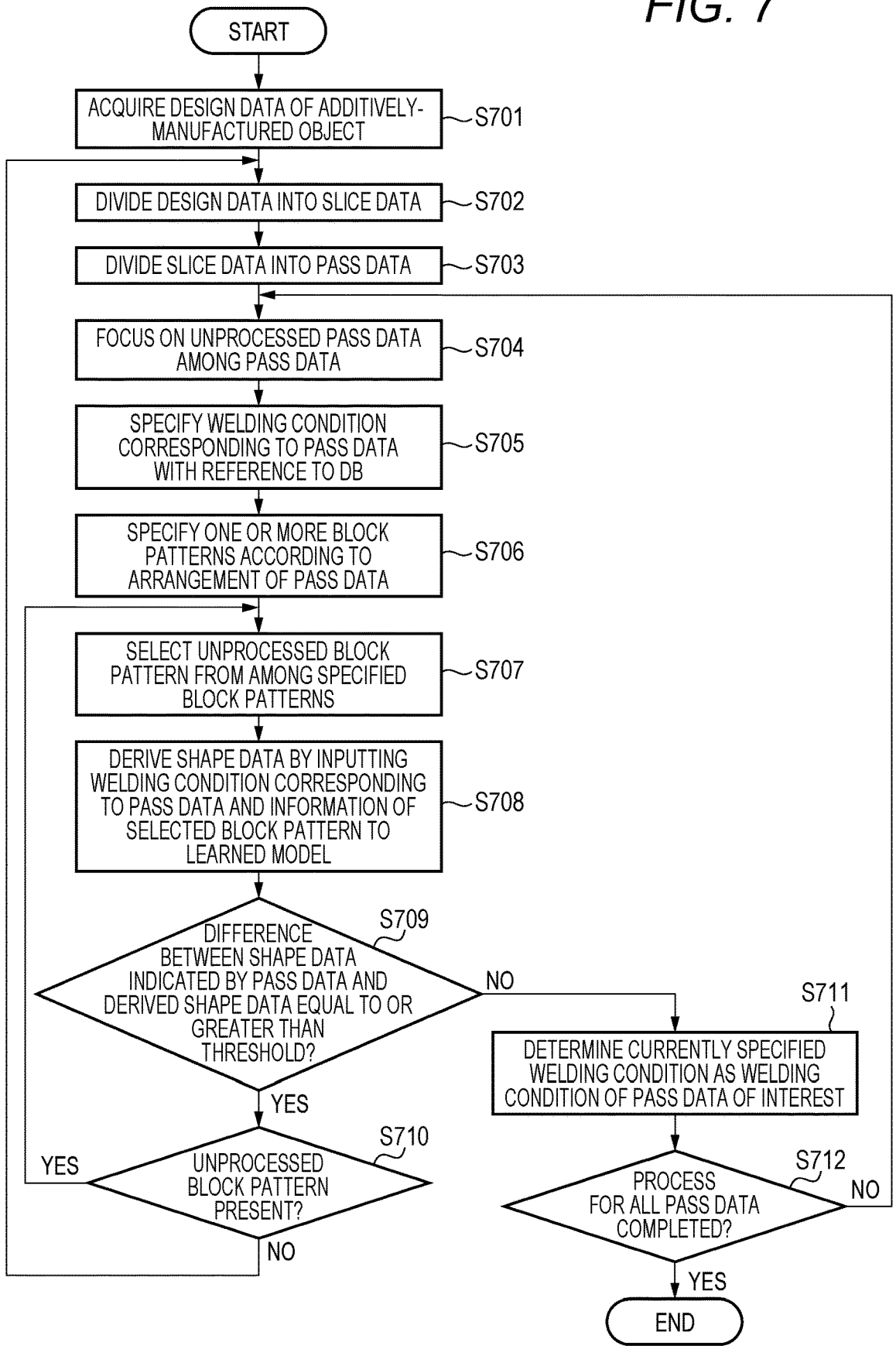
FIG. 7 is a flowchart of a determination process of a deposition condition according to an embodiment of the present invention.

FIG. 7 is a flowchart of a determination process of the welding condition according to the present embodiment. This process is performed and controlled by the information processing device 200, and may be implemented, for example, by a processing unit such as a CPU or a GPU included in the information processing device 200 reading out a program for implementing the units shown in FIG. 1 from a storage unit (not shown) and executing the program. The learning process described above is performed and a learned model is generated before the process flow is started. The present process is performed when the additively-manufactured object W starts to be manufactured.

In S701, the information processing device 200 acquires design data of the additively-manufactured object W. Here, the design data is data specifying a shape and the like of the additively-manufactured object W, and is created based on an instruction of a user. For example, the design data may be input from an external device (not shown) communicably connected to the information processing device 200, or may be created on the information processing device 200 via a predetermined application (not shown).

In S702, the information processing device 200 generates one or more pieces of slice data based on the design data acquired in S701. As shown in FIG. 5, the one or more pieces of slice data are generated by dividing setting data in a direction perpendicular to a predetermined deposition direction. Here, division conditions such as the number of layers and a thickness of the layer at the time of division are not particularly limited, and a plurality of settings can be selected according to a function or the like of the additive manufacturing system 1. The division conditions such as the thickness of the layer for generating the slice data are stored in a storage unit (not shown) together with the generated slice data.

In S703, the information processing device 200 generates a plurality of pieces of pass data based on each of the one or more pieces of slice data generated in S702 As shown in FIG. 5, by dividing one slice data, a plurality of pieces of pass data corresponding to one pass of the bead are generated. Here, division conditions such as the number of passes and a width per pass at the time of division are not particularly limited, and a plurality of settings can be selected according to the function or the like of the additive manufacturing system 1. The division conditions such as the number of passes and the width for generating the pass data are stored in the storage unit (not shown) together with the generated pass data. Here, the pass data may include information such as a movement trajectory of the torch 102 in addition to shape data indicating a bead shape. The shape data created here corresponds to a design value.

In S704, the information processing device 200 focuses on unprocessed pass data among the plurality of pieces of pass data generated in S703 (hereinafter, referred to as "pass data of interest"). Here, an order of interest may be, for example, an order of bead formation corresponding to the pass data.

In S705, the information processing device 200 specifies a welding condition for forming a bead having a shape indicated by the pass data of interest with reference to the DB described above. As described above, the welding condition is associated with the bead shape data in the DB, and the welding condition can be specified by specifying the shape data.

In S706, the information processing device 200 specifies one or more block patterns according to the arrangement of the pass data of interest. Adjacent beads that are formed are different depending on the order of formation when beads corresponding to the pass data are actually formed. Therefore, one or more block patterns corresponding to the pass data of interest are specified based on the order of formation of the beads.

In S707, the information processing device 200 selects a block pattern for which subsequent processes are not performed from among the block patterns specified in S706. Here, although a selection method is not particularly limited, for example, priority may be set for each of the block patterns and selection may be made based on the priority. More specifically, a block pattern may be selected in descending order of the number of passes forming the block pattern.

In S708, the information processing device 200 inputs the welding condition specified in S705 and the block pattern selected in S707 to the learned model that is already generated, thereby deriving shape data corresponding to the pass data of interest as output data. As described above, the shape data output here corresponds to the bead height corresponding to the pass data of interest, and is a predicted value when a bead is formed under the welding condition specified in S705.

In S709, the information processing device 200 compares the bead shape (design value) indicated by the pass data of interest with the bead shape (predicted value) derived in S708, and determines whether a difference (|design value— predicted value|, and |X| indicates an absolute value of X) is equal to or greater than a predetermined threshold. Here, the threshold is defined in advance and is stored and managed in a storage unit (not shown). If the difference is equal to or greater than the threshold (YES in S709), the process of the information processing device 200 proceeds to S710. On the other hand, if the difference is smaller than the threshold (NO in S709), the process of the information processing device 200 proceeds to S711. When the shape data includes a plurality of items such as a height and a width, respective differences are derived. In addition, when a plurality of items in the shape data are used for the determination, YES may be determined when all the items are equal to or greater than the threshold as a result of comparison between the items and the threshold. In this case, the threshold is set for each of the items.

In S710, the information processing device 200 determines whether the processes of S707 to S709 are performed on all the block patterns specified in S706. If there is an unprocessed block pattern (YES in S710), the process of the information processing device 200 returns to S707, and the subsequent processes are repeated. On the other hand, if there is no unprocessed block pattern (NO in S710), the process of the information processing device 200 returns to S702, and the subsequent processes are repeated. In this case, division conditions used in the division process for the slice data (S702) and the division process for the pass data (S703) are set to be different from the division conditions used in the previous division process. That is, the division process is performed again so as to change the design value of the bead shape. As described above, since the information processing device 200 according to the present embodiment can set a plurality of division conditions, an unused division condition is selected from the plurality of division conditions. A method of changing the division conditions is not particularly limited. For example, the division conditions for the division process into the slice data may be preferentially changed, and the division conditions for the division process into the pass data may be changed according to the result, or vice versa.

In S711, the information processing device 200 determines the currently specified welding condition as a welding condition of the pass data of interest.

In S712, the information processing device 200 determines whether the process for all the pass data is completed. If the process for all the pass data is completed (YES in S712), the process flow ends. On the other hand, if there is unprocessed pass data (NO in S712), the process of the information processing device 200 returns to S704, and the subsequent processes are repeated.

In the flowchart described above, in the case of NO in the determination process of S710, the process returns to the division process of S702. However, the present invention is not limited to this configuration, and the process may return to the division process of S703.

In the flowchart described above, the welding condition is determined after the design data of the additively-manufactured object W is collectively divided into the pass data, and the present invention is not limited thereto. For example, the design data of the additively-manufactured object W may be divided into a plurality of pieces, and the process shown in FIG. 7 may be performed for each of the plurality of pieces.

In addition, in the flowchart described above, an example in which the welding condition is adjusted by re-dividing the pass data corresponding to a bead has been described, and the present invention is not limited thereto. For example, by changing the formation order of the pass data, the block pattern corresponding to the pass data of interest may be changed for adjustment.

(Learning Data Generation Process)

Figure 8:
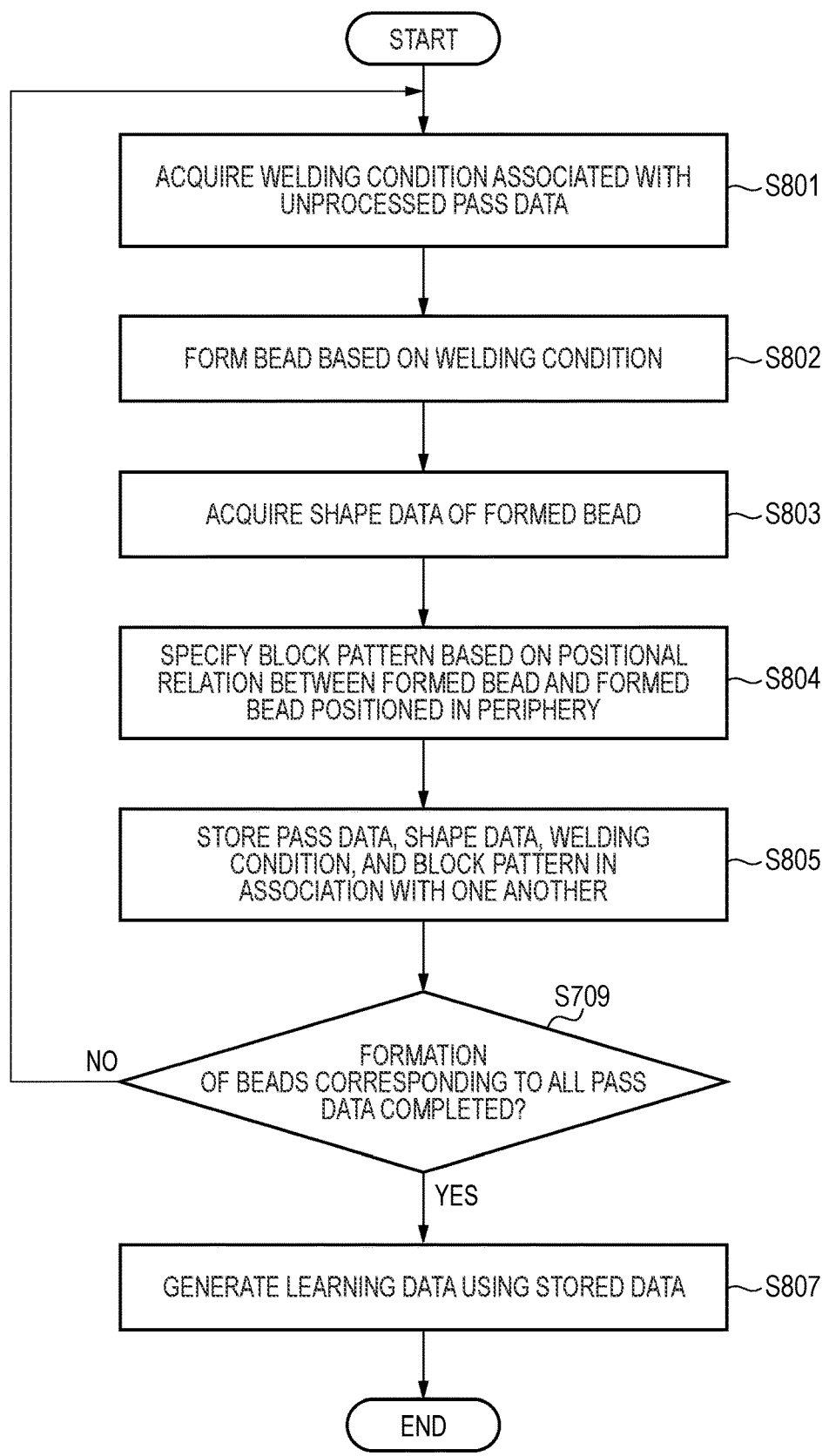
FIG. 8 is a flowchart of a learning data generation process according to an embodiment of the present invention.

FIG. 8 is a flowchart of a generation process of the learning data used in the learning process according to the present embodiment. This process is performed and controlled by the information processing device 200, and may be implemented, for example, by a processing unit such as a CPU included in the information processing device 200 reading out a program for implementing the units shown in FIG. 1 from a storage unit (not shown) and executing the program. In the present embodiment, a case will be described in which the shape data of a bead formed for manufacturing the additively-manufactured object W is acquired by the shape sensor 101 along with the manufacturing operation. The process flow is started when an instruction to start manufacture of the additively-manufactured object W is received. Whether to generate the learning data may be based on an instruction from a user of the additive manufacturing system 1, and may be selectable by the user.

In S801, the information processing device 200 selects unprocessed pass data from a plurality of pieces of pass data for manufacturing the additively-manufactured object W in accordance with a formation order that is already defined, and acquires a welding condition associated with the pass data.

In S802, the information processing device 200 causes the welding robot 104 to form a bead based on the welding condition acquired in S801.

In S803, the information processing device 200 measures a shape of the bead formed in S802 using the shape sensor 101, and acquires a measurement result as shape data. The measurement result may include at least one piece of information such as a height, a width, a volume, and an angle of a root part, and surface unevenness of the bead.

In S804, the information processing device 200 specifies one or more block patterns corresponding to the bead formed in S803 based on a positional relation between the bead formed in S803 and a surrounding bead that is already formed. The block pattern is specified by the method shown in FIG. 6. Further, a type of the block pattern is defined in advance as shown in FIG. 3, for example.

In S805, the information processing device 200 stores the pass data selected in S801, the shape data acquired in S803, and the block pattern specified in S804 in association with one another in a storage unit (not shown).

In S806, the information processing device 200 determines whether the formation of beads corresponding to all the pass data is completed. If there is unprocessed pass data (NO in S806), the process of the information processing device 200 returns to S801, and the process for the unprocessed pass data is repeated. If the process for all the pass data is completed, that is, if the manufacture of the additively-manufactured object W is completed (YES in S806), the process of the information processing device 200 proceeds to S807.

In S807, the information processing device 200 generates learning data using the stored various types of data. As described with reference to FIG. 4, the learning data according to the present embodiment includes a pair of input data (welding condition, block pattern) and teacher data (shape data) on the assumption of supervised learning, and the learning data is generated in accordance with this configuration. In the stored data, only items necessary for learning may be extracted from items included in the welding condition and the shape data. In the subsequent learning process, the learning data generated here is used. Then, the process flow ends.

FIG. 8 shows an example in which the formation of a bead and the generation of the learning data are performed in a series of flows. However, the present invention is not limited to this configuration, and the learning data may be generated at a timing at which predetermined data is accumulated. Alternatively, the information processing device 200 may provide the stored data to an external device (not shown) and generate the learning data in the external device.

As described above, according to the present embodiment, it is possible to determine a more appropriate welding condition at the time of manufacturing an additively-manufactured object.

OTHER EMBODIMENTS

In the present invention, a program or an application for implementing the functions of one or more embodiments described above may be supplied to a system or a device using a network, a storage medium, or the like, and one or more processors in a computer of the system or the device may read and execute the program.

The functions may be implemented by a circuit (for example, an application specific integrated circuit (ASIC) or a field programmable gate array (FPGA)) that implements one or more functions.

As described above, the present specification discloses the following matters.

(1) A machine learning device that performs machine learning of a welding condition for manufacturing an additively-manufactured object by welding a filler metal and depositing weld beads, the machine learning device including:

at least one hardware processor configured to perform a learning process for generating a learned model using a welding condition of a weld bead and a block pattern formed by the weld bead as input data and shape data of the weld bead as output data.

According to this configuration, it is possible to determine a more appropriate welding condition at the time of manufacturing an additively-manufactured object. In particular, when the welding condition is determined, it is possible to generate a learned model for determining a more appropriate welding condition in consideration of a block pattern formed by a bead corresponding to pass data.

(2) The machine learning device according to (1), wherein the block pattern includes any one of a pattern formed by two passes of one layer and two rows, a pattern formed by two passes of two layers and one row, a pattern formed by three passes of three layers and one row, or a pattern formed by four passes of two layers and two rows.

According to this configuration, by generating a learned model based on a relatively simple block pattern defined in advance, the processing load in a learning process can be reduced and efficient learning can be performed.

(3) The machine learning device according to (1), wherein the shape data includes at least one of a height, a width, or a volume of a weld bead.

According to this configuration, it is possible to generate a learned model focusing on any shape of a weld bead.

(4) The machine learning device according to (1), wherein the welding condition includes at least one of a feeding speed of the filler metal, a welding speed, a target position on a base on which the additively-manufactured object is manufactured, an amount of heat input at the time of manufacturing, a moving speed of a torch, an inter-pass temperature, or an inter-pass time.

According to this configuration, it is possible to generate a learned model by focusing on any welding condition item among various welding condition items.

(5) The machine learning device according to (1), wherein the at least one hardware processor performs the learning process using a supervised learning method using a neural network.

According to this configuration, it is possible to perform machine learning corresponding to supervised learning using a neural network.

(6) An additive manufacturing system for manufacturing an additively-manufactured object by welding a filler metal and depositing weld beads, the additive manufacturing system including:

at least one hardware processor configured to create, based on design data of the additively-manufactured object, a plurality of pieces of pass data corresponding to a plurality of weld beads forming the additively-manufactured object;

determine welding conditions for forming weld beads corresponding to the respective pieces of created pass data;

specify a block pattern formed by a weld bead based on an arrangement when the weld bead is formed;

derive shape data corresponding to pass data by inputting a determined welding condition corresponding to the pass data and the specified block pattern to a learned model generated by performing a learning process using a welding condition of a weld bead and a block pattern formed by the weld bead as input data and shape data of the weld bead as output data; and adjust the welding condition such that a difference between the derived shape data and shape data indicated by the created pass data does not exceed a predetermined threshold.

According to this configuration, it is possible to determine a more appropriate welding condition at the time of manufacturing an additively-manufactured object. In particular, when the welding condition is determined, it is possible to determine a more appropriate welding condition in consideration of a block pattern formed by a bead corresponding to pass data.

(7) The additive manufacturing system according to (6), wherein the at least one hardware processor adjusts the welding condition by repeating changing conditions when pass data is generated.

According to this configuration, by adjusting a condition for generating pass data based on design data, it is not necessary to adjust values of items included in a number of welding conditions for forming a weld bead, and the processing load can be reduced, making it easier to determine the welding conditions.

(8) The additive manufacturing system according to (6), wherein the at least one hardware processor is further configured to generate one or more pieces of slice data by dividing the design data of the additively-manufactured object into one or more layers in a direction perpendicular to a predetermined deposition direction, and divide each of the generated one or more pieces of slice data into a plurality pieces of pass data.

According to this configuration, it is possible to generate any pass data according to design data of an additively-manufactured object.

(9) The additive manufacturing system according to (6), wherein the at least one hardware processor specifies one or more block patterns formed by weld beads corresponding to pass data.

According to this configuration, it is possible to specify one or more block patterns for one piece of pass data and perform a welding condition determination process.

(10) The additive manufacturing system according to (9), wherein the at least one hardware processor derives shape data corresponding to the pass data in order, for the specified one or more block patterns, based on a priority defined in advance for block patterns.

According to this configuration, it is possible to sequentially perform a welding condition determination process for one or more block patterns specified for one piece of pass data according to any priority defined in advance for the block patterns.

(11) The additive manufacturing system according to (6), wherein the at least one hardware processor determines welding conditions for forming a weld bead corresponding to the created pass data using a database in which weld bead shapes are associated with welding conditions in advance.

According to this configuration, by determining welding conditions using a database in which bead shape data and welding conditions are associated in advance, when the welding conditions are determined, it is not necessary to individually adjust items of the conditions, and the processing load can be reduced.

(12) The additive manufacturing system according to (6), wherein the at least one hardware processor is further configured to acquire shape data of a weld bead when the weld bead is formed;

set, when the weld bead is formed, a block pattern formed by the weld bead based on a positional relation with another weld bead that is already formed; and generate learning data used for performing the learning process based on pass data of the weld bead, the acquired shape data, and the specified block pattern.

According to this configuration, it is possible to generate learning data to be used in the subsequent learning process in addition to the manufacture of an additively-manufactured object. By repeating the learning process using the learning data, it is possible to determine a more appropriate welding condition.

(13) A machine learning method of a welding condition for manufacturing an additively-manufactured object by welding a filler metal and depositing weld beads, the machine learning method including:

a learning process step of performing a learning process for generating a learned model using a welding condition of a weld bead and a block pattern formed by the weld bead as input data and shape data of the weld bead as output data.

According to this configuration, it is possible to determine a more appropriate welding condition at the time of manufacturing an additively-manufactured object. In particular, when the welding condition is determined, it is possible to generate a learned model for determining a more appropriate welding condition in consideration of a block pattern formed by a bead corresponding to pass data.

(14) A method for determining a welding condition in an additive manufacturing system that manufactures an additively-manufactured object by welding a filler metal and depositing weld beads, the method including:

a creation step of creating, based on design data of the additively-manufactured object, a plurality of pieces of pass data corresponding to a plurality of weld beads forming the additively-manufactured object;

a determination step of determining welding conditions for forming weld beads corresponding to the respective pieces of pass data created in the creation step;

a specifying step of specifying a block pattern formed by a weld bead based on an arrangement when the weld bead is formed;

a deriving step of deriving shape data corresponding to pass data determined in the determination step by inputting welding conditions corresponding to the pass data and the block pattern specified in the specifying step to a learned model generated by performing a learning process using a welding condition of a weld bead and a block pattern formed by the weld bead as input data and using shape data of the weld bead as output data; and an adjusting step of adjusting the welding conditions such that a difference between the shape data derived by the deriving unit and shape data indicated by the pass data created in the creation step does not exceed a predetermined threshold.

According to this configuration, it is possible to determine a more appropriate welding condition at the time of manufacturing an additively-manufactured object. In particular, when the welding condition is determined, it is possible to determine a more appropriate welding condition in consideration of a block pattern formed by a bead corresponding to pass data.

(15) A non-transitory computer readable medium storing a program configured to cause a computer to execute:

a learning process step of performing a learning process for generating a learned model using a welding condition of a weld bead forming an additively-manufactured object and a block pattern formed by the weld bead as input data and shape data of the weld bead as output data.

According to this configuration, it is possible to determine a more appropriate welding condition at the time of manufacturing an additively-manufactured object. In particular, when the welding condition is determined, it is possible to generate a learned model for determining a more appropriate welding condition in consideration of a block pattern formed by a bead corresponding to pass data.

(16) A non-transitory computer readable medium storing a program configured to cause a computer to execute:

a creation step of creating a plurality of pieces of pass data corresponding to a plurality of weld beads forming an additively-manufactured object, based on design data of the additively-manufactured object manufactured by welding a filler metal and depositing weld beads, a determination step of determining welding conditions for forming weld beads corresponding to the respective pieces of pass data created in the creation step, a specifying step of specifying a block pattern formed by a weld bead based on an arrangement when the weld bead is formed, a deriving step of deriving shape data corresponding to pass data determined in the determination step by inputting welding conditions corresponding to the pass data and the block pattern specified in the specifying step to a learned model generated by performing a learning process using a welding condition of a weld bead and a block pattern formed by the weld bead as input data and using shape data of the weld bead as output data, and an adjusting step of adjusting the welding conditions such that a difference between the shape data derived by the deriving unit and shape data indicated by the pass data created in the creation step does not exceed a predetermined threshold.

According to this configuration, it is possible to determine a more appropriate welding condition at the time of manufacturing an additively-manufactured object. In particular, when the welding condition is determined, it is possible to determine a more appropriate welding condition in consideration of a block pattern formed by a bead corresponding to pass data.

Although various embodiments have been described above with reference to the drawings, it is needless to say that the present invention is not limited to such examples. It is apparent to those skilled in the art that various changes and modifications can be conceived within the scope of the claims, and it is also understood that such changes and modifications belong to the technical scope of the present invention. In addition, constituent elements in the embodiments described above may be combined freely within a range not departing from the spirit of the present invention.

The present application is based on a Japanese patent application (Japanese patent application No. 2020-123775) filed on Jul. 20, 2020, contents of which are incorporated by reference in the present application.

REFERENCE SIGNS LIST 1 additive manufacturing system
100 additive manufacturing device
101 shape sensor
102 torch
103 base
104 welding robot
106 robot controller
107 power supply
108 weld bead
200 information processing device
201 manufacturing control unit
202 power supply control unit
203 feeding control unit
204 DB (database) management unit
205 shape data acquisition unit
206 learning data management unit
207 learning processing unit
208 welding condition derivation unit
W additively-manufactured object
M filler metal

The invention claimed is:
1. An additive manufacturing system for manufacturing an additively-manufactured object by welding a filler metal and depositing weld beads, the additive manufacturing system comprising:
   at least one hardware processor configured to
      create, based on design data of the additively-manufactured object, a plurality of pieces of pass data corresponding to a plurality of weld beads forming the additively-manufactured object;
      determine welding conditions for forming weld beads corresponding to the respective pieces of created pass data;
      specify one or more block patterns formed by the weld beads corresponding to the pass data based on an arrangement when the weld bead is formed;
      derive shape data corresponding to pass data by inputting a determined welding condition corresponding to the pass data and the specified block pattern to a learned model generated by performing a learning process using a welding condition of a weld bead and a block pattern formed by the weld bead as input data and shape data of the weld bead as output data, and derive the shape data corresponding to the pass data in order, for the specified one or more block patterns, based on a priority defined in advance for block patterns; and
      adjust the welding condition such that a difference between the derived shape data and shape data indicated by the created pass data does not exceed a predetermined threshold.

2. The additive manufacturing system according to claim 1, wherein
   the at least one hardware processor adjusts the welding condition by repeating changing conditions when the pass data is generated.

3. The additive manufacturing system according to claim 1, wherein
   the at least one hardware processor is further configured to
      generate one or more pieces of slice data by dividing the design data of the additively-manufactured object into one or more layers in a direction perpendicular to a predetermined deposition direction, and divide each of the generated one or more pieces of slice data into a plurality pieces of the pass data.

4. The additive manufacturing system according to claim 1, wherein
   the at least one hardware processor determines welding conditions for forming a weld bead corresponding to the created pass data using a database in which weld bead shapes are associated with welding conditions in advance.

5. The additive manufacturing system according to claim 1, wherein
   the at least one hardware processor is further configured to
      acquire shape data of a weld bead when the weld bead is formed;
      set, when the weld bead is formed, a block pattern formed by the weld bead based on a positional relation with another weld bead that is already formed; and
      generate learning data used for performing the learning process based on the pass data of the weld bead, the acquired shape data, and the specified block pattern.

* * * * *